United States Patent
Sugimoto

(10) Patent No.: US 7,497,473 B2
(45) Date of Patent: Mar. 3, 2009

(54) SHOULDER ADJUSTER

(75) Inventor: Mutsumi Sugimoto, Hamamatsu (JP)

(73) Assignee: Yuugengaisha Mutsumichi Kenkyujo, Hamamatsu-shi (JP)

( * ) Notice: Subject to any disclaimer, the term of this patent is extended or adjusted under 35 U.S.C. 154(b) by 491 days.

(21) Appl. No.: 10/515,317

(22) PCT Filed: Dec. 19, 2002

(86) PCT No.: PCT/JP02/13305

§ 371 (c)(1),
(2), (4) Date: Apr. 29, 2005

(87) PCT Pub. No.: WO03/099618

PCT Pub. Date: Dec. 4, 2003

(65) Prior Publication Data

US 2005/0173916 A1 Aug. 11, 2005

(30) Foreign Application Priority Data

May 29, 2002 (JP) ............................. 2002-156379

(51) Int. Cl.
*B60R 22/00* (2006.01)
(52) U.S. Cl. ................................................. 280/801.1
(58) Field of Classification Search ............... 280/801.1, 280/801.2, 808; 297/482, 483
See application file for complete search history.

(56) References Cited

U.S. PATENT DOCUMENTS

| 4,645,232 | A | * | 2/1987 | Hamada et al. .......... 280/801.1 |
| 4,652,012 | A | * | 3/1987 | Biller et al. ............... 280/801.2 |
| RE32,448 | E | * | 6/1987 | Anderson .................... 280/808 |
| 4,872,704 | A | * | 10/1989 | Biller et al. ............... 280/801.2 |
| 5,132,880 | A | * | 7/1992 | Kawamura .................. 362/488 |
| 5,437,475 | A | * | 8/1995 | Sugimoto ................ 280/801.2 |
| 5,908,205 | A | * | 6/1999 | Griesemer ............... 280/801.2 |
| 5,911,439 | A | * | 6/1999 | Pleyer et al. ............. 280/801.2 |
| 6,334,629 | B1 | * | 1/2002 | Griesemer et al. ........ 280/801.2 |
| 6,957,829 | B2 | * | 10/2005 | Rogers et al. ............ 280/801.1 |

FOREIGN PATENT DOCUMENTS

| JP | 157058/1989 | | 10/1989 |
| JP | 103854/1990 | | 8/1990 |
| JP | 04113959 A | * | 4/1992 |
| JP | 5-294208 | | 11/1993 |

* cited by examiner

*Primary Examiner*—Faye M. Fleming
(74) *Attorney, Agent, or Firm*—Oblon, Spivak, McClelland, Maier & Neustadt, P.C.

(57) ABSTRACT

A shoulder adjuster apparatus includes an adjusting base secured to a car body, a sliding base mounted on the adjusting base, and a garnish sliding together with the sliding base. The adjusting base 1 includes side walls formed by bending both edges, which are arranged in the width direction, at about 90 degrees with respect to a flat surface to be attached to the car body, and engaging portions formed by bending the ends of the side walls inwardly. The engaging portions and the side walls form acute angles. The sliding base is slidably inserted into a sliding part, which is defined by the side walls, the engaging portions, and the flat surface. According to the structure as described above, a shoulder adjuster apparatus having excellent shock absorbency, capable of preventing degradation of performance due to deformation and the like, and having excellent safety characteristics can be provided.

6 Claims, 16 Drawing Sheets

SHOULDER ADJUSTER

TECHNICAL FIELD

The present invention relates to shoulder adjuster apparatuses installed in automobiles, and specifically to a shoulder adjuster apparatus capable of adjusting the height of a webbing anchor according to the sitting height of a driver/passenger.

BACKGROUND ART

Installation of seatbelt apparatuses in automobiles is compulsory to ensure safety of drivers/passengers. When a driver/passenger operates a seatbelt apparatus to set a seatbelt (i.e., the webbing), the webbing may cause a so-called "hanging" state depending on the sitting height of the driver/passenger. To prevent such a hanging state and ensure a comfortable ride, a variety of shoulder adjuster apparatuses, which are capable of adjusting the height of a webbing anchor according to the sitting height of a driver/passenger, have been proposed.

Examples of shoulder adjuster apparatuses of this type include a seatbelt anchor apparatus and a webbing anchor apparatus that were proposed by the present inventor as shoulder adjuster apparatuses, and are disclosed in Japanese Unexamined Patent Application Publications Nos. 2-279445, 5-294208, and 2001-341614.

In known shoulder adjuster apparatuses, however, a strong impact force applied to a webbing anchor may cause a large impact load on the shoulder adjuster apparatus, deformation of the shoulder adjuster apparatus due to a heavy load particularly exerted on an engaging portion between an adjusting base and a sliding base, damage to the adjusting base and the sliding base, and impairment of adjusting function due to the deformation of the shoulder adjuster apparatus.

Moreover, the deformation of the shoulder adjuster apparatus due to a heavy load being exerted on the engaging portion between the adjusting base and the sliding base causes the adjusting base to be detached from the sliding base, the adjusting function of the shoulder adjuster apparatus to be impaired, and the shoulder adjuster apparatus to be disabled.

To provide a safer shoulder adjuster apparatus, a crucial issue that has been recognized is to improve the shape of the engaging portion between the adjusting base and the sliding base such that the strength thereof can be improved.

To adjust the height of the webbing anchor according to the sitting height of a driver/passenger, a latch mechanism needs to be pulled out against the elastic force of a spring.

However, to fix the shoulder adjuster apparatus at a desired height, this spring has a spring constant sufficient for preventing problems, such as detachment of a latch pin caused by vibrations or the like. Therefore, pulling out a button requires a large amount of force and cannot necessarily be performed easily by a drivers/passengers sitting in a seat. Thus, since the latch mechanism of the known shoulder adjuster apparatus does not have sufficient operability for adjusting the height of the webbing anchor, there has been a demand for the development of a mechanism capable of tightly securing the webbing anchor while exhibiting excellent operability in terms of adjusting the height of the webbing.

Moreover, in the latch mechanism of the known shoulder adjuster apparatus, it is assumed, in some rare cases, that vibrations and impacts cause a button section to malfunction because of the structure of a fixed button. It has also been pointed out that this may cause the latch pin to be pulled out of a lock hole and change the height of the webbing anchor while riding in the car. A strong impact force applied to the shoulder adjuster apparatus from one direction, particularly at the time of impact, causes the shoulder adjuster apparatus to malfunction.

There is also a possibility that the height of the webbing anchor may be changed at the time of impact, because an air bag installed in the car for ensuring the safety of drivers/passengers presses the shoulder adjuster apparatus from one side, thus causing the shoulder adjuster apparatus to malfunction. Therefore, improved stability of a button, which serves as an operating section, has been demanded to improve vibration resistance and impact resistance of the latch mechanism.

Moreover, vibrations while the car is moving bring the latch pin and a lock hole into contact, which produces metallic noises. In the known shoulder adjuster apparatus, to reduce such metallic noises caused by contact, the tip of the latch pin is coated with a resin or provided with an O-ring for noise reduction. This increases the number of components required to form the shoulder adjuster apparatus and causes an increase in material costs and production costs.

The present invention is made in view of the circumstances described above and aims to provide a shoulder adjuster apparatus having excellent shock absorbency, capable of preventing degradation of performance due to deformation and the like, and having excellent safety characteristics.

Another object of the present invention is to provide a shoulder adjuster apparatus in which a latch mechanism installed therein offers improved impact resistance and vibration resistance to prevent malfunctioning, and in which a webbing anchor ensures its stability when it is fixed, which improves its operability during the height adjustment.

Another object of the present invention is to provide a shoulder adjuster apparatus in which contact noise produced from a latch pin and a lock hole of the latch mechanism installed in the shoulder adjuster apparatus is reduced.

DISCLOSURE OF INVENTION

To solve the problems described above, a shoulder adjuster apparatus comprising:
an adjusting base;
a sliding base;
a garnish;
a latch mechanism; and a webbing anchor,
wherein the adjusting base is secured to an attaching part of a car body frame, the sliding base is slidably mounted on the adjusting base along a longitudinal direction of the adjusting base; the garnish is mounted on a front side of the sliding base; the latch mechanism stopping the garnish and sliding base selectively at a certain position along the longitudinal direction; the webbing anchor is attached to the sliding base and garnish; the adjusting base includes side walls formed by bending both edges, which are arranged in a width direction of the adjusting base, at about 90 degrees with respect to a flat surface to be attached to the car body frame, and also includes engaging portions formed by bending the edges of the side walls toward the inside of the adjusting base; the side walls and the engaging portions form acute angles; and the sliding base is slidably inserted into a sliding part, which is defined by the flat surface, the side walls, and the engaging portions, in the adjusting direction.

To solve the problems described above, in the shoulder adjuster apparatus, the angles formed by the side walls and the engaging portions range from 70 to 80 degrees.

To solve the problems described above, in the shoulder adjuster apparatus, both edges of the sliding base, the edges being arranged in the width direction, are bent to form engaging edges; and the bending angles of the engaging edges range from 10 to 20 degrees with respect to a flat surface of the sliding base on a side of the car body frame.

To solve the problems described above, in the shoulder adjuster apparatus, the latch mechanism further comprises:
a latch pin;
an inner button; and an outer button,
wherein the latch pin is removably inserted, from a side of the sliding base facing the garnish, into a lock hole of the adjusting base by a elastic force of a spring; the inner button is integrally secured to the latch pin provided with the spring; the outer button covering the inner button so as to come into contact with the garnish; at least one engaging lug is provided on each of both surfaces of the outer button to be in contact with the garnish, the surfaces being arranged in the width direction, to engage with at least one outer-button engaging part provided on each of both surfaces of the garnish to be in contact with the outer button, the surfaces being arranged in the width direction, so as to secure the latch mechanism at both sides; wherein the engaging lugs and the outer-button engaging parts on both sides are disengaged by holding both sides of the outer button, so as to freely insert the latch pin into and to pull out of the lock hole in the adjusting base.

To solve the problems described above, in the shoulder adjuster apparatus, wherein a shape of a curved surface of a cylindrical pin section of the latch pin to be inserted into the lock hole in the adjusting base is the same as the shape of the lock hole in the adjusting base, thereby placing the pin section of the latch pin in close contact with an inner periphery of the lock hole in the adjusting base when the webbing anchor is fixed.

To solve the problems described above, in the shoulder adjuster apparatus, wherein the latch pin is screwed into a latch-pin securing section provided in the inner button.

Figure 1:
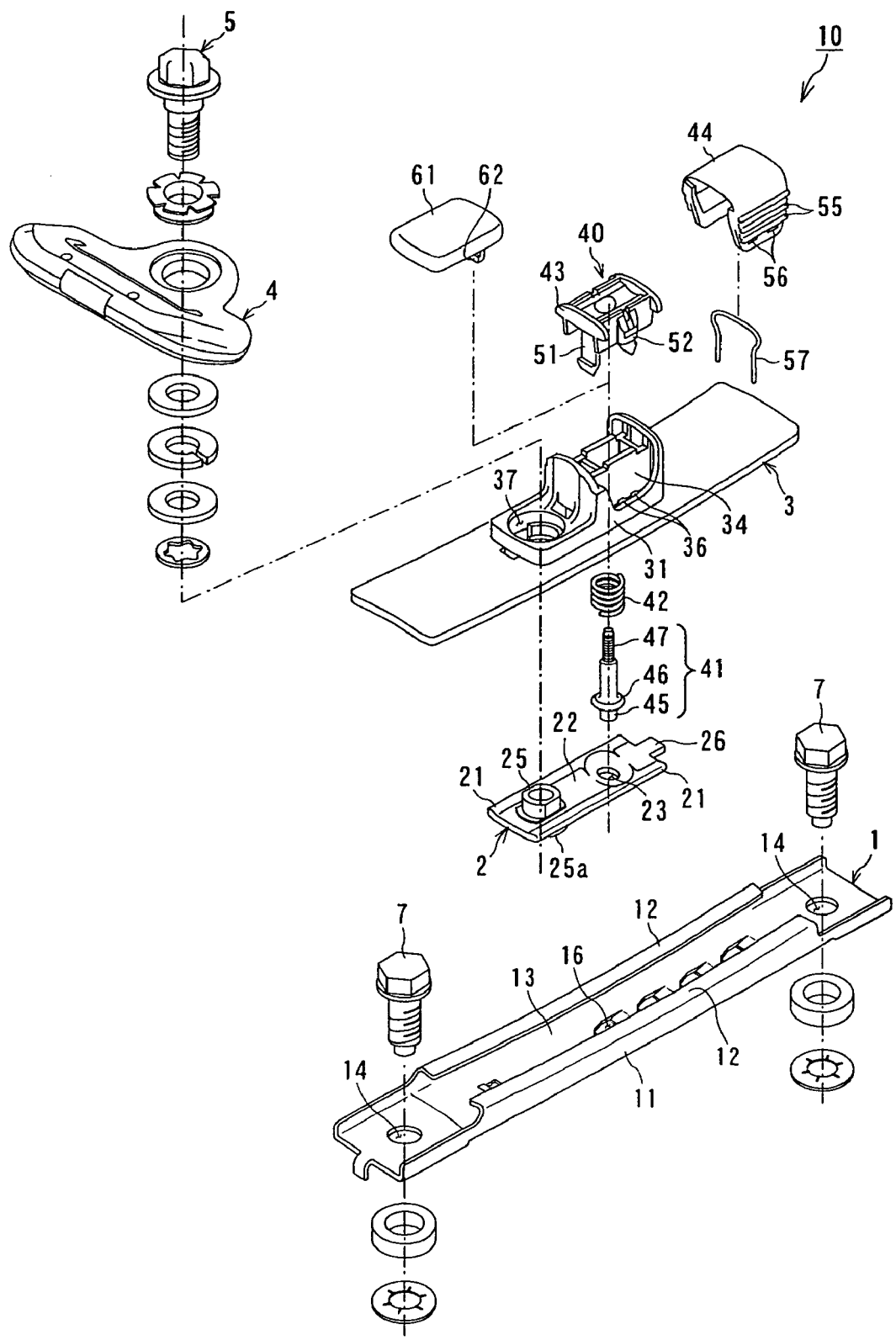
FIG. 1 is an assembly drawing showing an embodiment of a shoulder adjuster apparatus according to the present invention.

In the Figures, the following reference numerals represent the structure listed:

1: adjusting base, 2: sliding base, 3: garnish, 4: webbing anchor, 5: anchor bolt, 10: shoulder adjuster apparatus, 11: side wall, 12: engaging portion, 13: flat surface, 14: mounting hole, 15: stopper, 16: lock hole, 17: inclined piece, 21: engaging end, 22: flat surface, 23: hole, 24: hole, 25: anchor nut, 25a: flange, 26: mounting piece, 31: box case, 32: sliding-base fitting part, 33: sliding-base engaging part, 34: inner-button engaging part, 35: spring-mounting seat, 36: outer-button engaging part, 37: hole section, 40: latch mechanism, 41: latch pin, 42: spring, 43: inner button, 44: outer button, 45: pin section, 46: flange, 47: connecting-shaft section, 48: latch-pin securing section, 51: hook, 52: outer-button retainer, 53: through hole, 55: rough portion, 56: engaging lug, 57: button spring, 61: cover, 62: mounting section.

BEST MODE FOR CARRYING OUT THE INVENTION

Embodiments of a shoulder adjuster apparatus according to the present invention will now be described with reference to the drawings.

Figure 2:
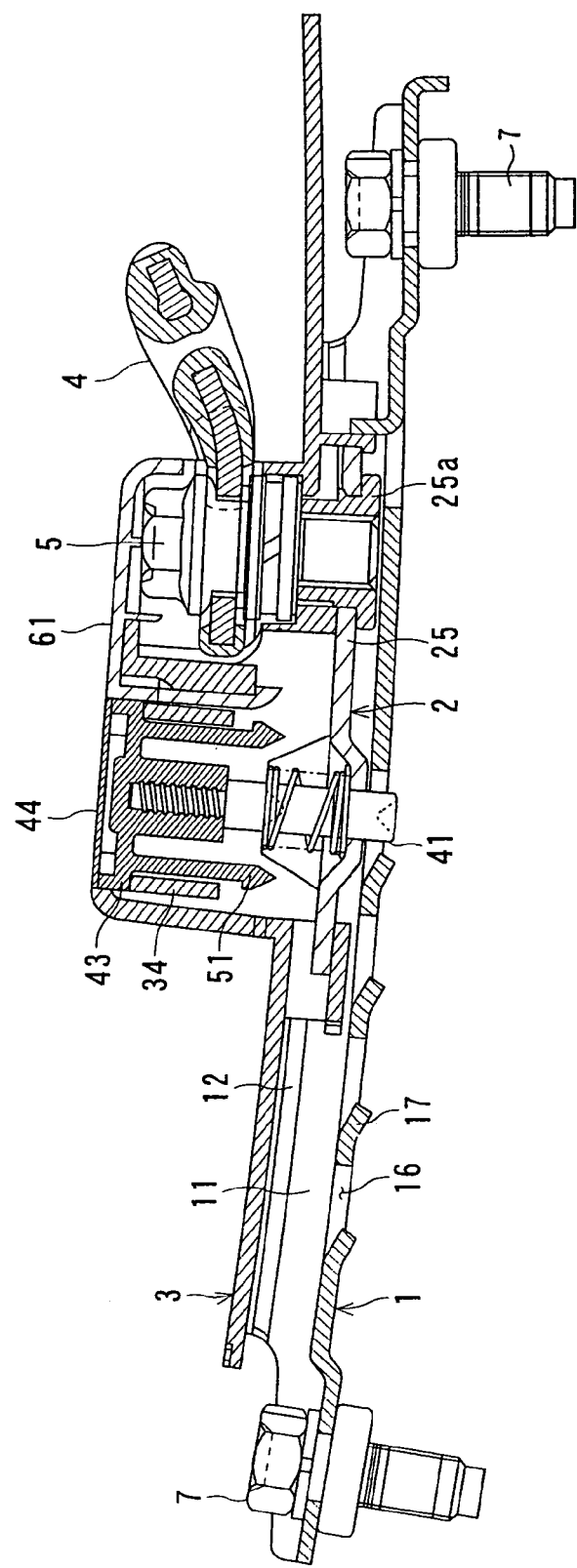
FIG. 2 is an overall cross-sectional view showing the embodiment of the shoulder adjuster apparatus according to the present invention.
Figure 3:
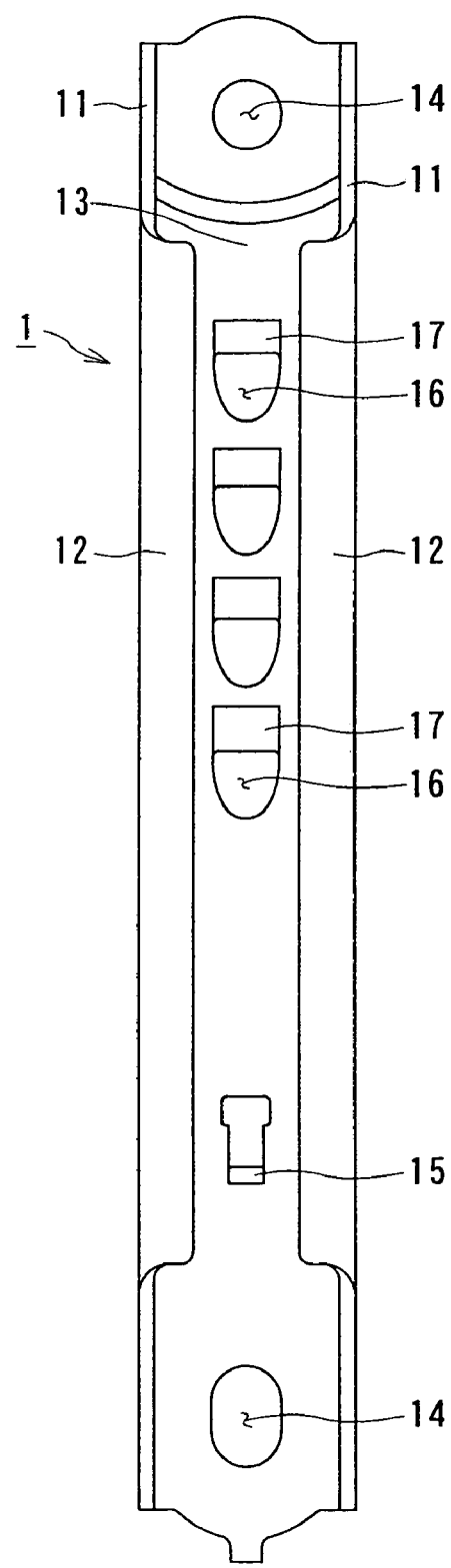
FIG. 3 is a front view of an adjusting base.
Figure 4:
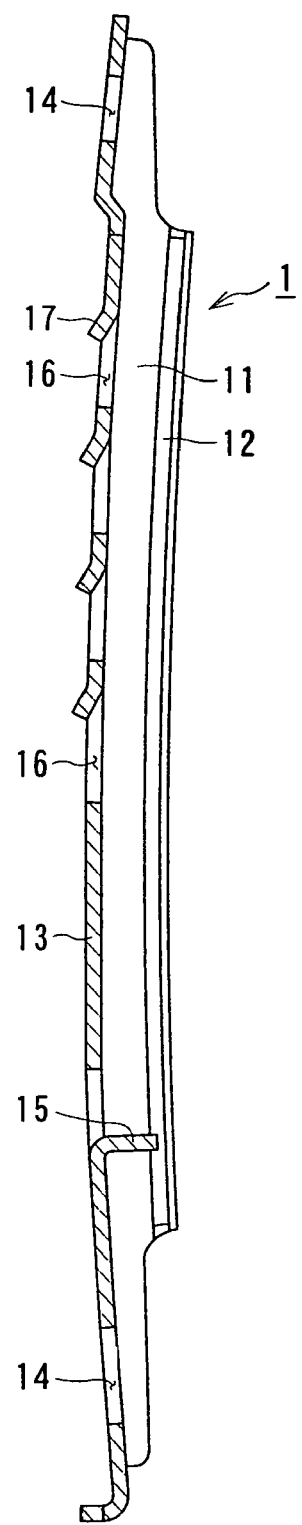
FIG. 4 is a longitudinal cross-sectional view of the adjusting base.
Figure 5:
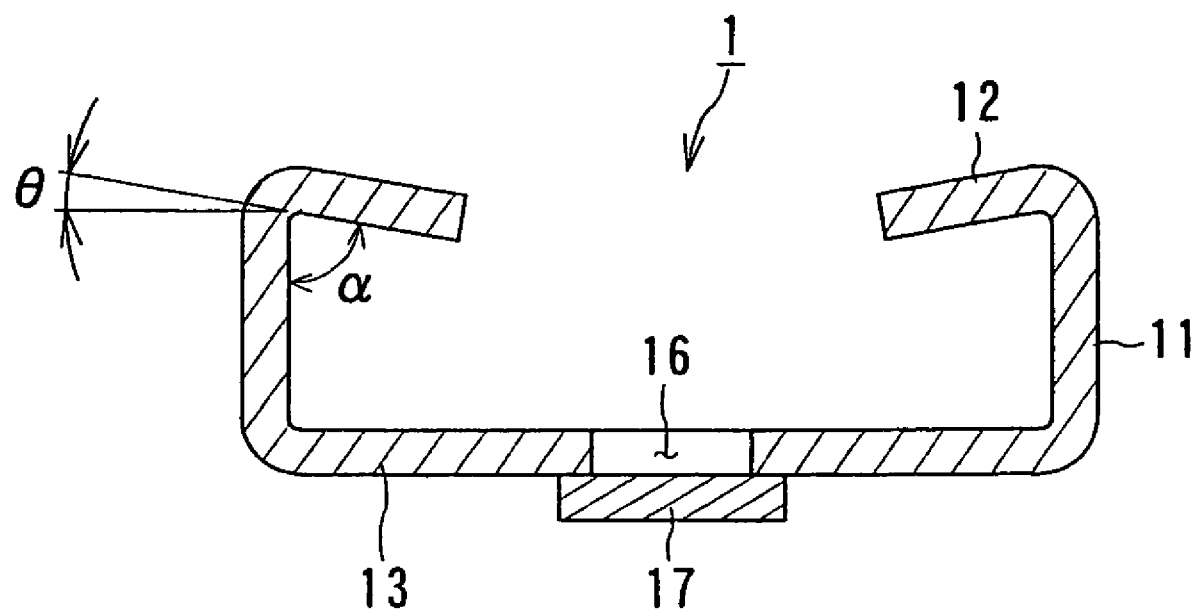
FIG. 5 is a cross-sectional view taken along the width of the adjusting base.
Figure 6:
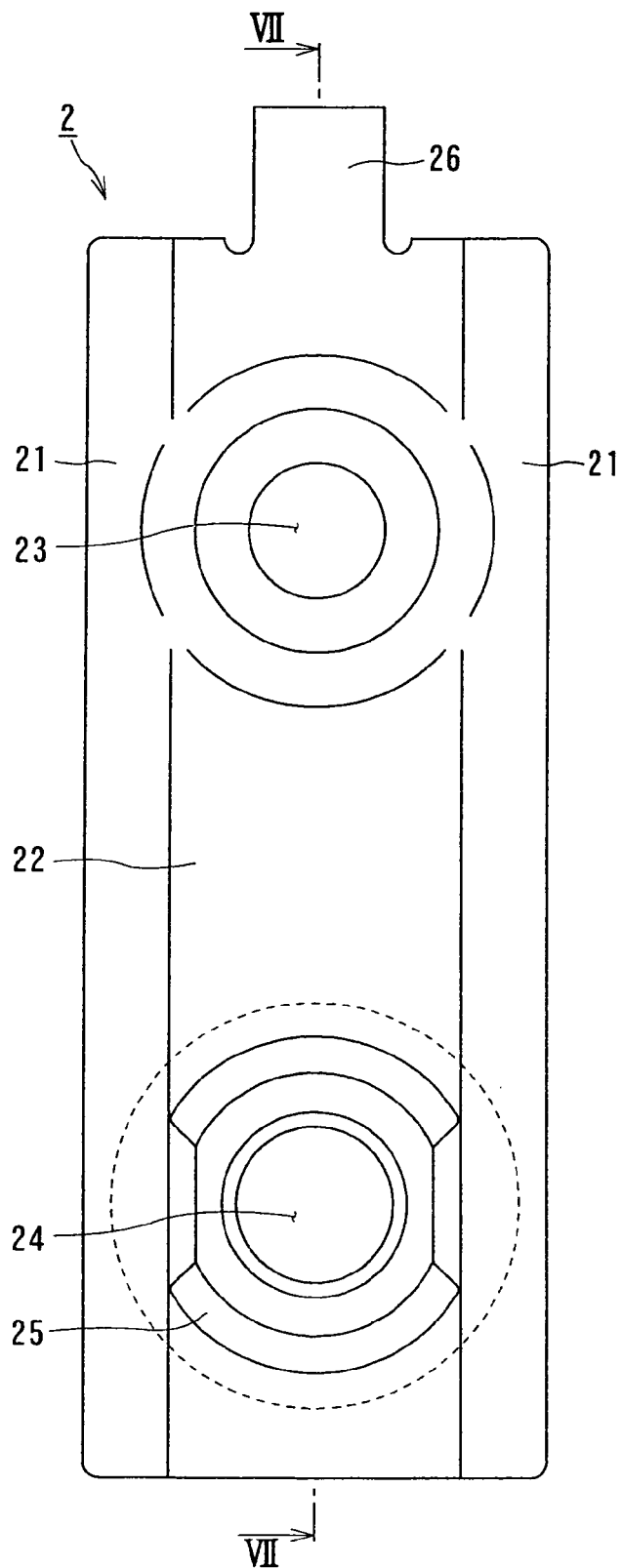
FIG. 6 is a front view of a sliding base.
Figure 7:
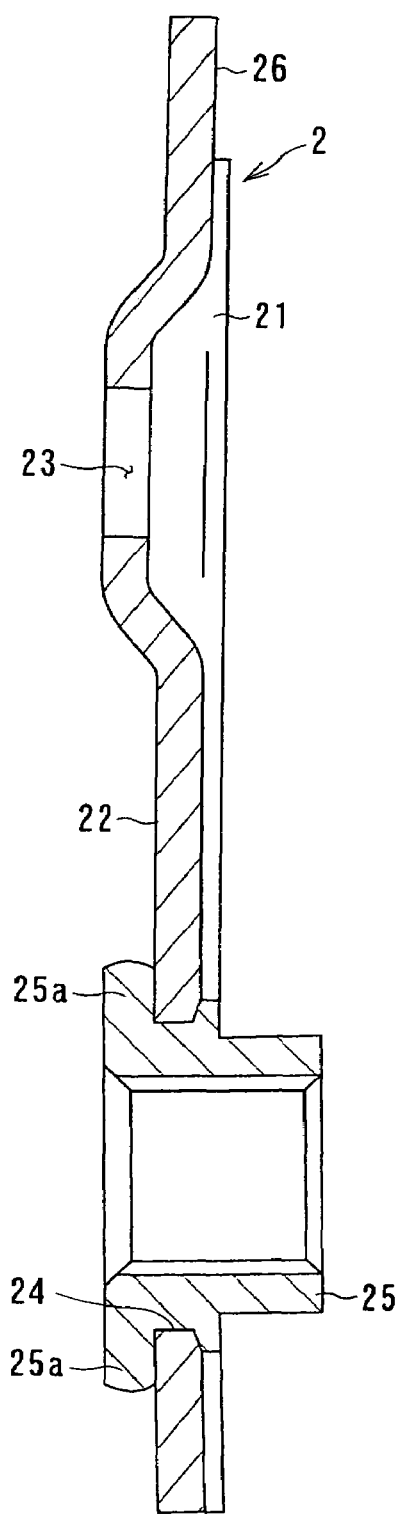
FIG. 7 is a longitudinal cross-sectional view taken along line VII-VII in FIG. 6 showing the sliding base.
Figure 8:
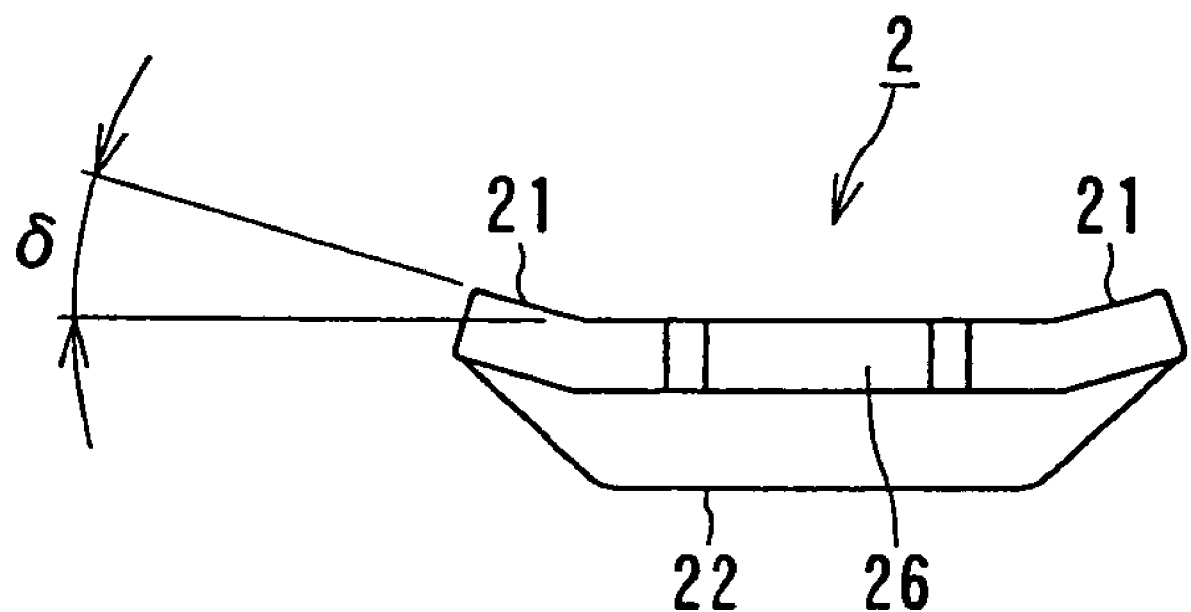
FIG. 8 is a cross-sectional view taken along the width of the sliding base.
Figure 9:
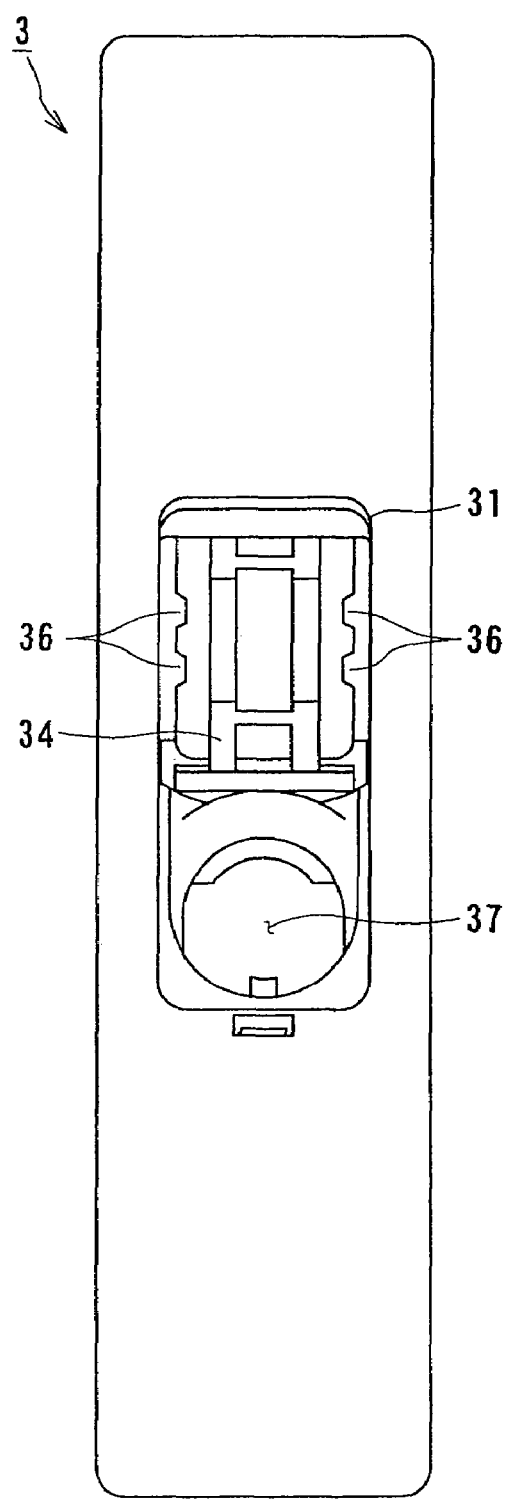
FIG. 9 is a front view of a garnish.
Figure 10:
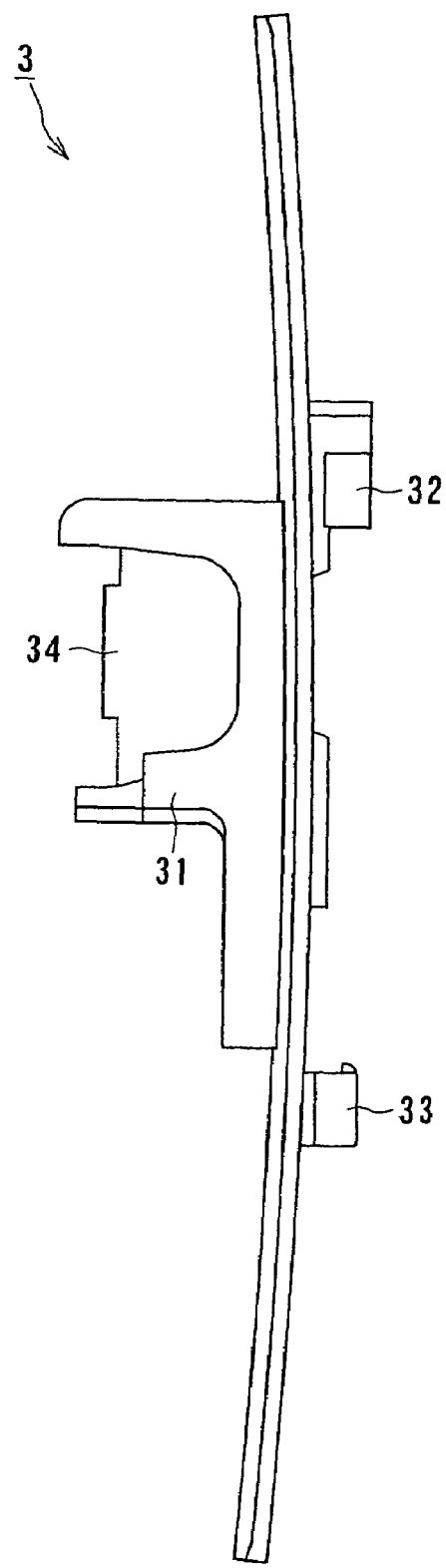
FIG. 10 is a side view of the garnish.
Figure 11:
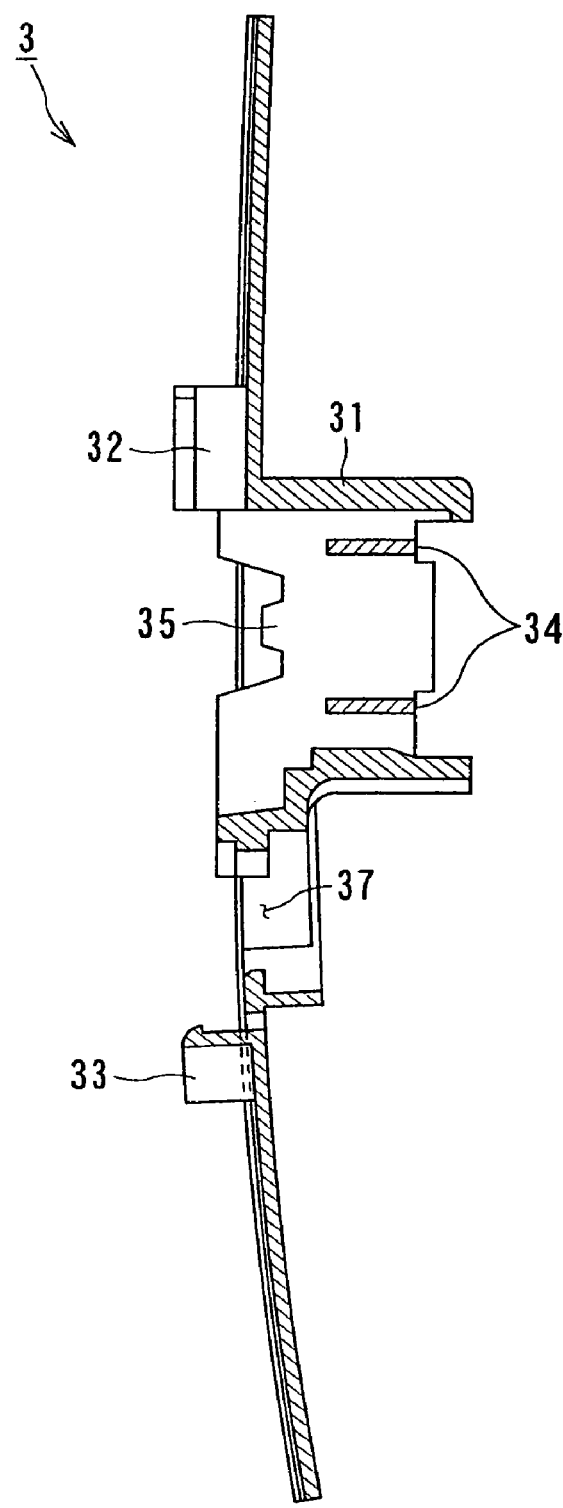
FIG. 11 is a longitudinal cross-sectional view of the garnish.
Figure 12:
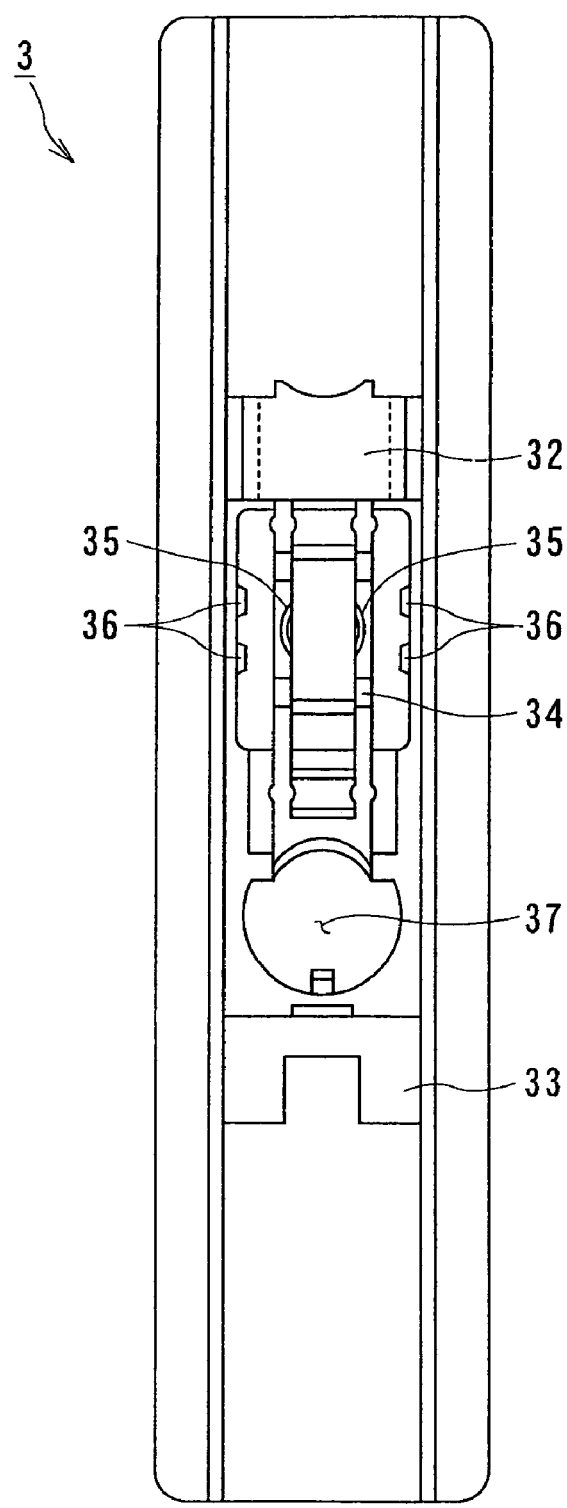
FIG. 12 is a front view showing a surface of a garnish to be attached to the car body.

As shown in FIGS. 1 and 2, a shoulder adjuster apparatus 10 includes a long adjusting base 1 to be secured to a center pillar of the car body, a sliding base 2 slidable along the longitudinal direction of the adjusting base 1, and a resin garnish 3 disposed on a surface (in front) of the sliding base 2 and slidable together with the sliding base 2. A webbing anchor 4 is attached to the sliding base 2 with an anchor bolt 5.

The structure of the adjusting base 1 will now be described in detail with reference to FIG. 1 and FIGS. 3 to 5.

The adjusting base 1, which is made of metal, is gently curved so as to fit with the center pillar of the car body to be attached, along the longitudinal (vertical) direction. In the thickness direction of the adjusting base 1, there is a small level difference between the middle section and the upper and lower ends, such that the middle section projects toward the inside of the car, with respect to the level of the upper and lower ends to be secured to the car body.

This longitudinal curved shape of the adjusting base 1 described above and bent shapes at both edges are designed, in consideration of the geometric moment of inertia, to fully resist warpage and bending under a tensile load in every direction, and to successfully absorb energy to prevent deformation in response to an impact caused by the application of pressure.

Each of both edges of the adjusting base 1 is bent upward from a surface so as to be attached to the car body to form an angle of about 90 degrees, thereby forming a pair of side walls 11 facing each other. Each edge of the side walls 11 is bent toward the inside of the adjusting base 1, along the longitudinal direction of the adjusting base 1, which is in the shape of a watershoot, by an angle of over 90 degrees, thereby forming an engaging portion 12 for engaging and slidably retaining the sliding base 2.

A bent angle α defined by the engaging portion 12 and the side wall 11 is an acute angle. According to the present inventors, the bent angle a is preferably below 90 degrees, and more specifically, ranges from 70 to 80 degrees. In other words, referring to the cross-sectional view of the sliding base 2 shown in FIG. 5, bending is preferably performed such that an angle θ with respect to a flat surface 13 of the engaging portion 12 ranges from 10 to 20 degrees.

When the bent angle α is set lower than 90 degrees, significantly high bend-resistant rigidity is provided in the engaging portion 12, and the geometric moment of inertia increases. Therefore, even if an impact load is applied to the sliding base 2, the sliding base 2 can be reliably and effectively prevented from being detached from the adjusting base 1.

Moreover, shock absorbency of the adjusting base 1 is particularly high when an angle θ of the engaging portion 12 with respect to a flat surface 13 ranges from 15 to 20 degrees (that is, the bent angle a defined by the engaging portion 12 and the side wall 11 ranges from 70 to 75 degrees). In this case, since deformation of the adjusting base 1 at the time of impact can be more effectively prevented, separation of the adjusting base 1 and the sliding base 2 can be more reliably prevented even if subjected to a strong impact.

Mounting holes 14 for bolt insertion are provided at the respective upper and lower sides that serve as the bases of the adjusting base 1. The adjusting base 1 is mounted on the center pillar with bolts 7 through these mounting holes 14, thereby being secured to the car body. A stopper 15, which is a raised piece for retaining the sliding base 2, is provided in the vicinity of the mounting hole 14 at the lower end of the adjusting base 1.

The flat surface 13, which is the bottom of the adjusting base 1, is provided with a predetermined number of lock holes 16 equally spaced along the longitudinal direction. Thus, positioning of the sliding base 2, that is, adjustment of the height of the webbing anchor 4 can be carried out by selectively inserting a latch pin, which serves as a latch member described below, into the lock holes 16.

This adjusting base 1 is provided with, for example, four lock holes 16 vertically arranged. The upper edge of each lock hole 16 is provided with a lug-shaped inclined piece 17 serving as a pin guide. Since the lock holes 16 are structured as described above, the latch pin can easily move upward along inclined surfaces of the inclined pieces 17. However, because of a stopping function of the lower edges of the lock holes 16, the latch pin cannot move downward unless the latch pin is pulled out more than a certain extent.

A curved surface at the lower edge of each lock hole 16 is formed at the same curvature as that of a curved surface of the tip of the latch pin. Thus, the latch pin can be stably retained since the latch pin is brought into close contact with a lock hole at the time of securing the webbing anchor.

The structure of the sliding base 2 will now be described in detail with reference to FIG. 1 and FIGS. 6 to 8.

To engage with the adjusting base 1 and maintain good slidability, the sliding base 2 is formed of a substantially-rectangular flat plate having a cross-sectional area slightly smaller than that of a watershoot-shaped sliding portion defined by the side walls 11, engaging portions 12, and flat surface 13 of the adjusting base 1. Both edges across the width of the sliding base 1 (both left and right edges when the sliding base 2 is fixed to the car body) are bent toward the inside of the car to form engaging edges 21, thereby forming a certain angle θ with respect to a flat surface 22 on the side of the car body.

The engaging edges -21 are formed along the engaging portions 12 of the adjusting base 1 so as to properly engage therewith. Therefore, the bent angle δ of the engaging edge 21 with respect to the flat surface 22 preferably ranges from 10 to 20 degrees, in accordance with an angle of the engaging portion 12 of the adjusting base 1.

Impact resistance of the sliding base 2 is particularly high when the bent angle δ of the engaging edge 21 with respect to the flat surface 22 ranges from 15 to 20 degrees, since the engaging edge 21 firmly engages with the engaging portion 12 of the adjusting base 1 to form a wedge shape. This sliding base 2 described above is preferable since the sliding base 2 can be reliably prevented from being detached from the adjusting base 1.

The above-described sliding base 2 is inserted into the adjusting base 1 to bring the engaging edges 21 of the sliding base 2 into engagement with the engaging portions 12 of the adjusting base 1, thereby slidably arranging the sliding base 2 along the longitudinal direction of the adjusting base 1.

Since both edges across the width of the sliding base 2 are bent along the engaging portions 12 of the adjusting base 1 toward bent portions of the engaging portion 12, the sliding base 2 is brought into surface contact with the adjusting base 1. Thus, the contact area increases and the strength of impact resistance of the shoulder adjuster apparatus at the time of impact can be greatly increased.

The flat surface 22 of the sliding base 2 is provided with two holes 23 and 24 at the center, the holes being spaced along the longitudinal direction. One hole 23 is positioned on the upper side when the shoulder adjuster apparatus 10 is in use, and serves as a pin-insertion hole for insertion of a latch pin described below. This pin-insertion hole 23 is positioned at the bottom center of a concave portion that is recessed toward the side facing the adjusting base 1.

The other hole 24 is positioned lower than the pin-insertion hole 23 when the shoulder adjuster apparatus 10 is in use, and serves as a nut-fixing hole. An anchor nut 25, into which the anchor bolt 5 for retaining the webbing anchor 4 is screwed, is secured to the nut-fixing hole 24. The anchor nut 25 is in the shape of a cylinder and has a flange 25a at one end. The anchor nut 25 is inserted, from the undersurface of the sliding base 2 (the side facing the adjusting base 1), into the hole 24 to project from the surface. The projecting portion of the anchor nut 25 is swaged to the sliding base 2, thereby being integrated with the sliding base 2 while the flange 25a is in contact with the undersurface of the sliding base 2.

An end of the sliding base 2, for example, the upper end when the sliding base 2 is mounted on the adjusting base 1 is slightly narrower than the width of the flat surface 22 and projects longitudinally to form a mounting piece 26 for securing the sliding base 2 to the garnish 3.

As described above, the angle θ is defined in the engaging portions 12 of the adjusting base 1, while the engaging edges 21 having the same angle α as that of the engaging portions 12 are provided at both edges, which engage with the adjusting base 1, of the sliding base 2. Thus, since shock absorbency of the shoulder adjuster apparatus 10 at the time of impact increases, and deformation of the adjusting base 1 and the sliding base 2 is effectively prevented, the sliding base 2 can be reliably prevented from being separated from the adjusting base 1 when an impact is applied to the shoulder adjuster apparatus 10. Thus, safety of the shoulder adjuster apparatus 10 is greatly improved.

The structure of the garnish 3 will now be described in detail with reference to FIG. 1 and FIGS. 9 to 12.

The garnish 3 is made of resin and formed by molding. The garnish 3 as a whole is a long flat cover covering the adjusting base 1 and the sliding base 2 from the inside of the car. A box case 31 disposed substantially at the center in the longitudinal direction of the garnish 3 is secured to the sliding base. 2 so as to be movable together with the sliding base 2.

To secure the sliding base 2 to the garnish 3 at the upper and lower points in the mounting direction, a sliding-base fitting part 32 and a sliding-base engaging part 33, respectively, are longitudinally arranged on the mounting surface of the garnish 3 to be mounted on the sliding base 2.

That is, while the mounting piece 26 of the sliding base 2 is inserted along the longitudinal direction of the sliding base 2 to fit in the sliding-base fitting part 32, the lower end of the sliding base 2 is brought into engagement with a hook of the sliding-base engaging part 33 in a lower position of the garnish 3 so as to be integrally secured. Thus, the sliding base 2 is mounted on the garnish 3 at two points spaced along the longitudinal direction of the garnish 3, and is integrally and stably secured.

The fit clearance of the sliding-base fitting part 32 and the sliding-base engaging part 33 with respect to the adjusting base 1 is preferably smaller than that between the sliding base 2 and the adjusting base 1. Since the garnish 3 is structured as described above, the fit clearance between the resin garnish 3 and the metal adjusting base 1 as a whole is smaller than that between the sliding base 2 and the adjusting base 1 that are both made of metal. Thus, metallic contact noise of the sliding base 2 and the adjusting base 1 caused, for example, by vibrations can be prevented.

The box case 31 of the garnish 3 includes an inner-button engaging part 34 and a spring-mounting seat 35. An outer-button engaging part 36 is provided in an area where the garnish 3 is in contact with an outer button described below.

A hole section 37 is provided at the lower end of the box case 31 when mounted on the car. At the time of attaching the sliding base 2 to the garnish 3, the anchor nut 25 is fitted into the hole section 37.

Thus, the sliding base 2 and the garnish 3 are combined together and slidably mounted on the adjusting base 1. The sliding position is determined by a latch mechanism described below and the height of the webbing anchor 4 can be adjusted.

Operation of a latch mechanism 40 will now be described in detail with reference to FIG. 1 and FIGS. 13 to 20, which illustrate the structures of the latch mechanism 40 and its components.

The latch mechanism 40 includes a latch pin 41 to be inserted into the lock hole 16 of the adjusting base 1, a spring 42 biasing the latch pin 41 toward the lock hole 16, an inner button 43 retaining and securing the latch pin 41 and the spring 42 such that the latch pin 41 can be freely inserted into the lock hole 16 with the elasticity of the spring 42, and an outer button 44 for holding and controlling the latch pin 41 such that the latch pin 41 can be pulled out of the lock hole 16 against the elastic force of the spring 42.

As shown in FIG. 1, the latch pin 41 includes a short cylindrical pin section 45 to be inserted into the lock hole 16 of the adjusting base 1, a flange 46 provided in the pin section 45, and a connecting-shaft section 47 extending from the flange 46 toward the side to be attached to the inner button 43, thereby forming an integrated unit made of metal. The pin section 45 is removably inserted into the hole 23 of the sliding base 2 toward the adjusting base 1.

A curved surface of the cylindrical pin section 45 of the latch pin 41 is formed at the same curvature as that of the lower edge of the lock hole 16 of the adjusting base 1. When the webbing anchor 4 is fixed, a downward force is always applied to the latch pin 41. However, since the curved shape of the pin section 45 and the curved shape at the lower edge of the lock hole 16 are the same, degradation of the contact between the pin section 45 and the lock hole 16 can be prevented even if the webbing anchor 4 vibrates. Thus, a stable contact between the latch pin 41 and the adjusting base 1 can be ensured and the occurrence of metallic noise can be prevented. This composition eliminates the need, for example, for a resin coating or O-ring, which is conventionally applied to the tip of the latch pin for noise prevention. Thus, the production cost of the shoulder adjuster apparatus 10 can be greatly reduced.

The flange 46 of the latch pin 41 comes into contact with a surface of a concave portion surrounding the hole 23 of the sliding base 2. Then, the flange 46 not only serves as a pin-projection stopper that maintains the latch pin 41 in the state where the pin section 45 projects toward the adjusting base 1 to a certain extent, but also serves as a retainer for the spring 42.

The spring 42 is a compression coil spring to be provided outside the connecting-shaft section 47 of the latch pin 41. While one end of the spring 42 is retained by the flange 46 of the latch pin 41, the other end is secured by the spring-mounting seat 35 provided inside the garnish 3. The latch pin 41 is always spring-biased toward the adjusting base 1 by the action of the spring 42.

The connecting-shaft section 47 of the latch pin 41 has a threaded portion, which is to be screwed into and integrated with a latch-pin securing section 48 in the inner button 43. Screwing of the latch pin 41 eases the assembly of the latch mechanism 40 and greatly reduces the production cost of the shoulder adjuster apparatus 10.

The connecting-shaft section 47 of the latch pin 41 may have a wedge shape and may be heated and pressed into the inner button 43, thereby combining the latch pin 41 and the inner button 43 together such that they cannot be pulled out.

The shape and structure of the inner button 43 of the latch mechanism 40 will now be described in detail with reference to FIG. 1 and FIGS. 13 to 16.

The inner button 43 has a saddle shape and is arranged in the garnish 3 such that the latch pin 41 can be pulled out to a certain extent. The inner button 43 can be pulled out by holding the outer button 44.

The inner button 43 is provided with hooks 51 at points corresponding to the inner-button engaging parts 34 of the garnish 3. The hooks 51 engage with the respective inner-button engaging parts 34 in the garnish 3 to engage the inner button 43 with the garnish 3.

The large-diameter cylindrical latch-pin securing section 48 into which the connecting-shaft section 47 of the latch pin 41 is inserted is provided in the inner center of the inner button 43. The connecting-shaft section 47 of the latch pin 41 is screwed or pressed into the latch-pin securing section 48 in the inner button 43 and secured.

Figure 13:
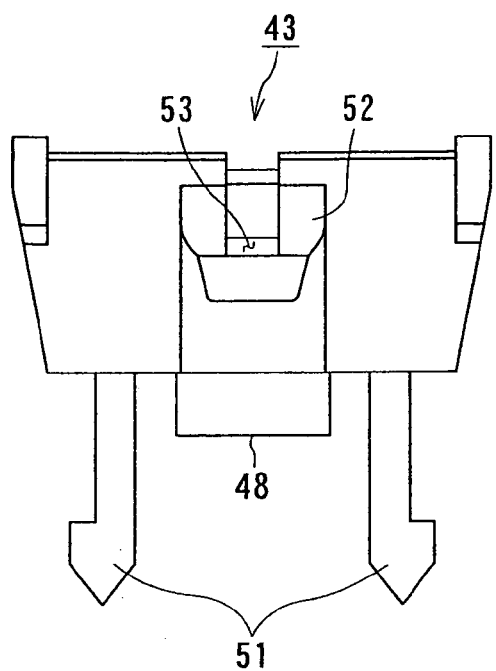
FIG. 13 is a side view of an inner button.
Figure 14:
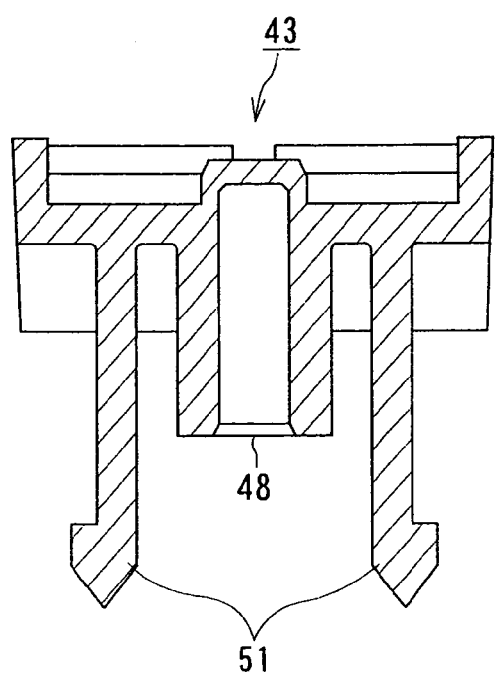
FIG. 14 is a longitudinal cross-sectional view of the inner button.
Figure 15:
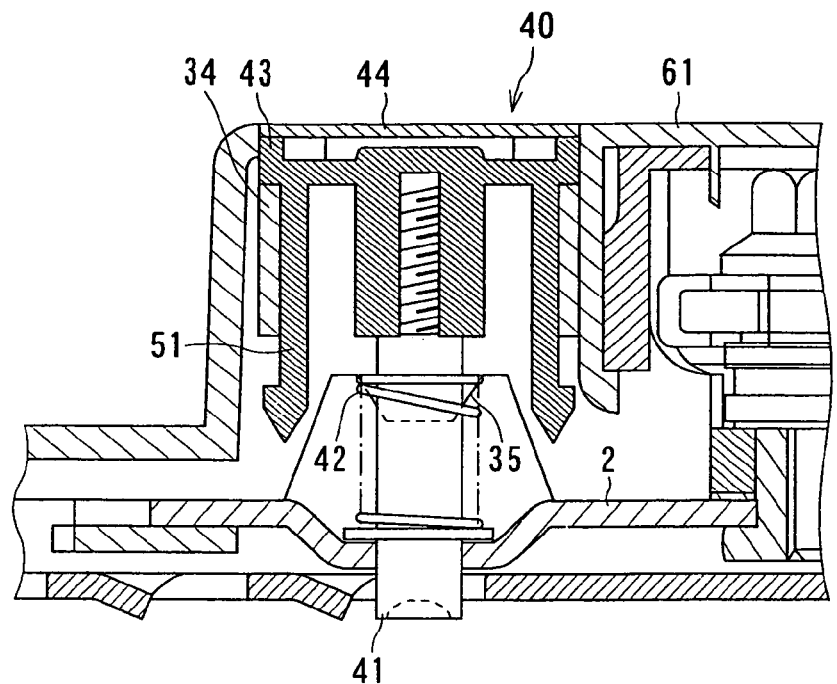
FIG. 15 is a longitudinal cross-sectional view of the shoulder adjuster apparatus for explaining a latch mechanism when a webbing anchor is fixed.
Figure 16:
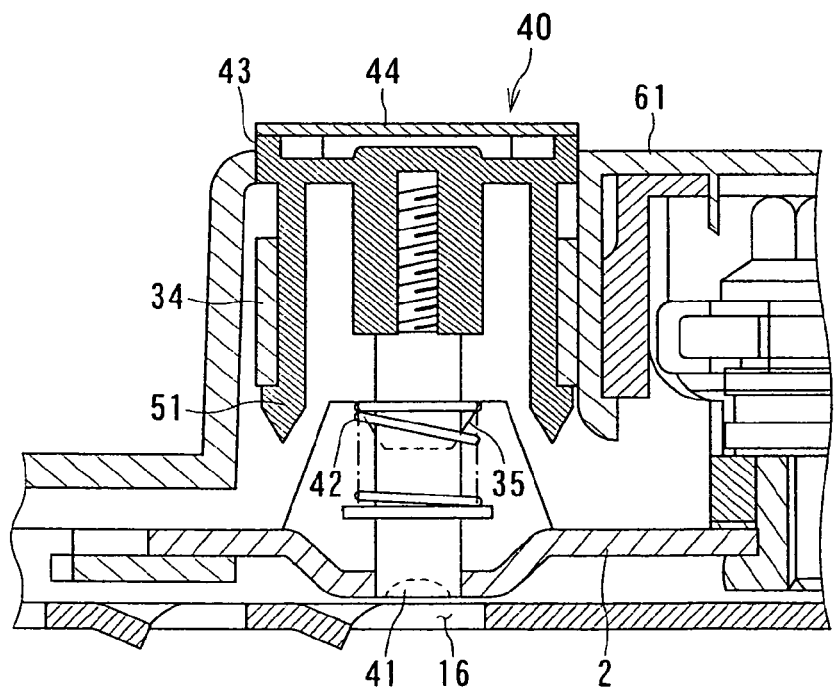
FIG. 16 is a longitudinal cross-sectional view of the shoulder adjuster apparatus for explaining the latch mechanism during adjustment of the height of the webbing anchor.

The inner button 43, as shown in FIGS. 13 and 14, has a pair of outer-button retainers 52, which are brought into contact with the internal side surface of the outer button 44 when the outer button 44 is held, on the respective side walls on the left and right arranged in the width direction of the inner button 43. Each outer-button-retainer 52 is provided with a through hole 53 into which a button spring 57 is inserted.

The hooks 51 of the inner button 43 have the function of determining a sliding range of the latch mechanism 40 when the latch mechanism 40 is held and operated. That is, when no adjustment operation of the shoulder adjuster apparatus 10 is performed, the inner button 43 is pulled toward the car body by the elastic force of the spring 42, and the hooks 51 of the inner button 43 are free to move (see FIG. 15).

At the time of the height adjustment of the webbing anchor 4, that is, when the latch mechanism 40 is held and operated, the inner button 43 is pulled out against the elastic force of the spring 42. Here, the flange 46 and the spring-mounting seat 35 cause a compressive force to be exerted on the spring 42. When the inner button 43 is pulled but to a certain extent against the elastic force of the spring 42 caused by this compressive force, the hooks 51 are moved into engagement with the inner-button engaging parts 34 of the garnish 3 so as to serve as stoppers (see FIG. 16), thereby preventing the inner button 43 from being further pulled out. In this state, the latch pin 41 can be pulled out of the lock hole 16 in the adjusting base 1 and the latch mechanism 40 is released. Then, holding and raising of the outer button 44 allow the sliding base 2 to slide along the longitudinal direction of the adjusting base 1, and lowering of the outer button 44 allow the height of the sliding base 2 to be adjusted. When the outer button 44 is released after the height adjustment, the latch pin 41 projects into the lock hole 16 of the adjusting base 1 to secure the latch mechanism 40.

Figure 17:
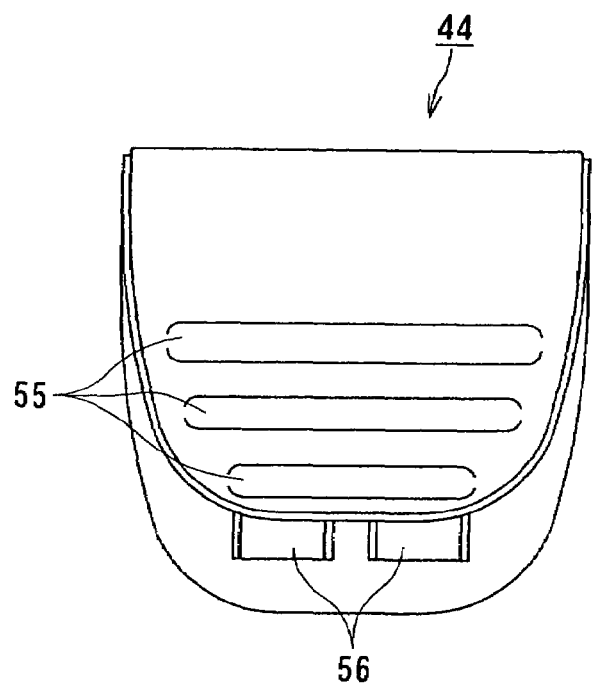
FIG. 17 is an external side view of an outer button.
Figure 18:
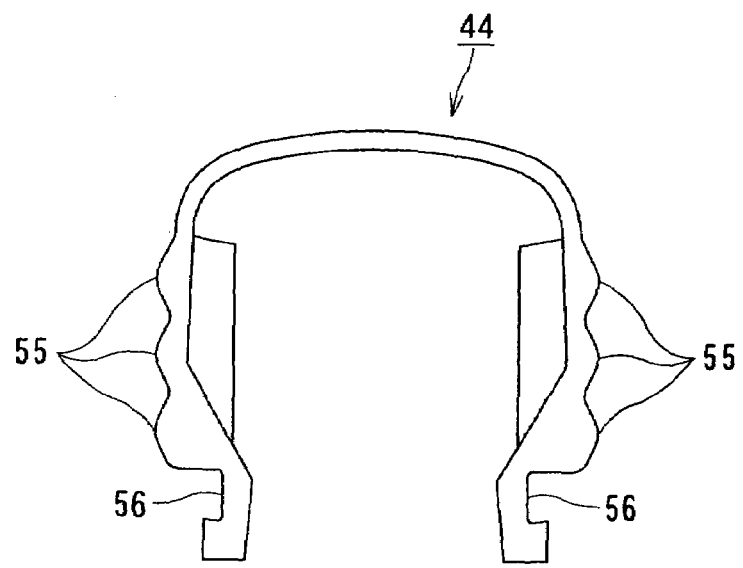
FIG. 18 is a cross-sectional view taken along the width of the outer button.

The structure and functions of the outer button 44 will now be described in detail with reference to FIGS. 1, 17, and 18.

The outer button 44 serves as, for example, a pull member that is formed of a substantially rectangular box made of a resin material. Rough portions 55 are provided on the outer surface of the outer button 44 for easier grip with the fingers. The outer button 44 is provided with engaging lugs 56 on both side surfaces to be in contact with the internal side surfaces of the box case 31 of the garnish 3. When the webbing anchor 4 is fixed, the engaging lugs 56 on the left and right engage with the respective outer-button engaging parts 36 on the internal side surfaces of the box case 31.

A button spring 57 (wire spring) shaped to fit the inner surface of the outer button 44 is provided inside the outer button 44. The button spring 57 is inserted into the through hole 52 of outer-button retainer 52 of the inner button 43 and secured. The button spring 57 not only provides appropriate elasticity and grip feeling when the outer button 44 is held and operated, but also presses and secures the outer button 44 to the garnish 3 when the latch mechanism 40 is fixed, thereby retaining the webbing anchor 4 at a certain height.

Figure 19:
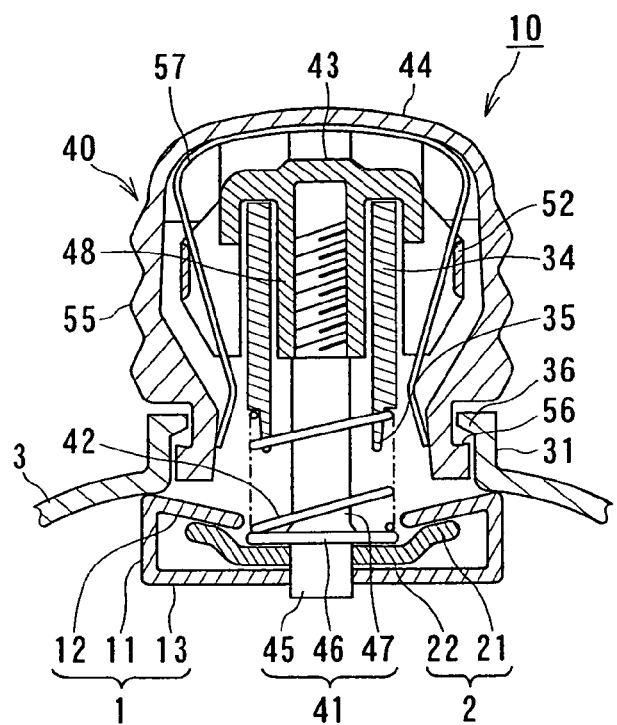
FIG. 19 is a cross-sectional view taken along the width of the shoulder adjuster apparatus when the webbing anchor is fixed.

In the shoulder adjuster apparatus 10, when the webbing anchor 4 is fixed, the engaging lugs 56 of the outer button 44 are secured to the outer-button engaging parts 36 of the garnish 3 on both the left and right sides (see FIG. 19).

The latch mechanism 40 has parts, on both the left and right sides, which are secured to the garnish 3 and become operable only by holding both the left and right sides of the outer button 44 and pulling it. That is, a force generated by an impact to a car body is exerted on a shoulder adjuster apparatus normally from one of the left and right directions. In the shoulder adjuster apparatus 10, even if an impact from one side causes the engaging lug 56 of the outer button 44 and the outer-button engaging part 36 of the garnish 3 to be unlocked at one of the left and right sides, the latch mechanism 40 is always stably secured, since the engaging lug 56 and the outer-button engaging part 36 on the other side are locked. Thus, malfunctions of the shoulder adjuster apparatus 10 caused by impacts are completely prevented.

When the shoulder adjuster apparatus 10 is in use, since detachment of the latch pin 41 of the latch mechanism 40 due to vibrations and impacts can be effectively and reliably prevented, loss of functions of the webbing anchor 4 caused by changes of the height of the webbing anchor 4 can be prevented. Thus, since the latch mechanism 40 securing the webbing anchor 4 has excellent stability, safety of the shoulder adjuster apparatus 10 is greatly improved.

Figure 20:
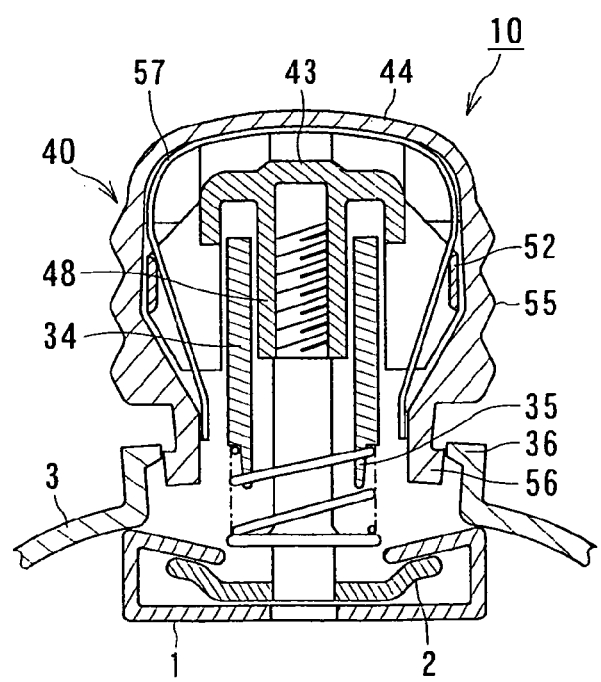
FIG. 20 is a cross-sectional view taken along the width of the shoulder adjuster apparatus during adjustment of the height of the webbing anchor.

When a driver/passenger holds and pulls the outer button 44 during operation of the latch mechanism 40, the engaging lugs 56 of the outer button 44 and the outer-button engaging parts 36 of the garnish 3 are separated to allow the height of the webbing anchor 4 to be adjusted (see FIG. 20). Here, the outer button 44 is held with appropriate elasticity provided by the button spring 57. Moreover, grip feeling is improved since the outer-button retainers 52 on the side walls of the inner button 43 are in contact with the inner surface of the outer button 44 so as to support the outer button 44. Thus, the latch mechanism 40 can be provided with excellent operability.

The button spring 57 may not be specifically provided in the case where the outer button 44 is made of resin with excellent elasticity and serves as a spring with appropriate elasticity.

On the other hand, the elastic force of the spring 42 allows the pin section 45 at the tip of the latch pin 41 to project from the pin-insertion hole 23 of the sliding base 2 toward the lock hole 16 of the adjusting base 1. When the latch pin 41 is completely inserted into the lock hole 16 of the adjusting base 1, no vertical movement of the pin section 45 with respect to the adjusting base 1 is allowed, unless the outer button 44 is pulled out.

Moreover, in the shoulder adjuster apparatus 10, stability of the webbing anchor 4 when its height is fixed is further improved because the latch mechanism 40 is constituted of the inner button 43 and the outer button 44 to improve the fixed state of the webbing anchor 4 when its height is fixed. Thus, an extremely safe shoulder adjuster apparatus 10 can be provided since detachment and malfunctions of the latch pin 41, due to vibrations and impacts when the shoulder adjuster apparatus 10 is in use, can be reliably prevented.

When the webbing anchor 4 is fixed, the tip of the latch pin 41 is stopped while being in contact with the lower edge of the lock hole 16 in the adjusting base 1. When the latch mechanism 40 is to be moved downward so as to adjust the height of the webbing anchor 4, the height adjustment cannot be performed unless the latch pin 41 is pulled out by pulling the outer button 44. When the latch mechanism 40 is to be moved upward so as to adjust the height of the webbing anchor 4, the inclined piece 17 provided in each lock hole 16 allows the tip of the pin section 45 to gradually rise along the inclined surface of the inclined piece 17, thereby allowing the height adjustment to be performed.

The spring 42 biasing the latch pin 41 is retained by the flange 46 of the latch pin 41 and the spring-mounting seat 35 of the garnish 3. The flange 46 and the spring-mounting seat 35 compress and retain the spring 42 to bias the latch pin 41 toward the adjusting base 1 via the flange 46 with which the spring 42 is in contact. To operate the latch mechanism, the outer button 44 is pulled out against the elastic force of the spring 42.

Moreover, in this shoulder adjuster apparatus 10, since the latch pin 41 including the connecting-shaft section 47 with a threaded portion is screwed into the latch-pin securing section 48 of the inner button 43 so as to combine the latch pin 41 and the inner button 43 together, connecting components conventionally required for such connection become unnecessary and the number of components can thus be reduced.

The number of components can also be reduced by forming the connecting-shaft section 47 of the latch pin 41 into a wedge shape, and by pressing and connecting the connecting-shaft section 47 to the latch-pin securing section 48 of the inner button 43 to combine them together.

The garnish 3 is provided with a cover 61 covering a mounting section of a mounting bolt of the webbing anchor 4 such that the mounting section cannot be seen from the inside of the car. The cover 61 is made of the same resin material as that of the garnish 3 and has a coronal shape. The cover 61 is fastened to the garnish 3 with lug-shaped mounting sections 62.

The sliding base 2 and the garnish 3 structured as described above are slidably fitted on the adjusting base 1, which is secured to the car body with the bolts 7 at the upper and lower ends.

The garnish 3, the inner button 43, the outer button 44, and the cover 61 are preferably made of the same resin. These members made of the same resin allow color matching and texture (surface-shape) matching of the product to be easily performed, and are convenient for designing. Polypropylene resins and POM resins (polyacetals) are desirable for producing such members.

An assembly procedure of the shoulder adjuster apparatus 10 will now be described with reference to FIG. 1.

First, the button spring 57 is attached inside the outer button 44, which combines with the inner button 43 to form an integrated unit. The hooks 51 of the inner button 43 engage with the inner-button engaging parts 34 of the garnish 3 so as to be integrated. Then, the latch pin 41 together with the spring 42 are introduced from the surface of the garnish 3 to be attached to the adjusting base 1 such that the connecting-shaft section 47 of the latch pin 41 is screwed into the latch-pin securing section 48 of the inner button 43. Thus, the latch pin 41, the spring 42, the inner button 43, the outer button 44, and the garnish 3 are integrally assembled. The latch mechanism 40 is also assembled through this assembly process.

Subsequently, the lower end of the sliding base 2 engages with the hooks of the sliding-base engaging part 33 of the garnish 3, such that the mounting piece 26 of the sliding base 2 fits in the sliding-base fitting part 32 of the garnish 3 while the anchor nut 25 premounted on the sliding base 2 fits in the hole section 37 of the garnish 3 for mounting the webbing anchor 4. Thus, the garnish 3 and the sliding base 2 are integrally assembled.

The garnish 3 and the sliding base 2 integrated as described above are inserted from the upper end of the adjusting base 1 to bring the engaging edges 21 of the sliding base 2, the sliding-base engaging part 33 and sliding-base fitting part 32 of the garnish 3 into engagement with the engaging portions 12 of the adjusting base 1.

After the webbing anchor 4 is attached with the anchor bolt 5, the cover 61 is attached to form the shoulder adjuster apparatus 10. Installation of the shoulder adjuster apparatus 10 to the car body, installation of the webbing and the like are subsequently performed.

In this shoulder adjuster apparatus 10, each of the engaging portions 12 and the engaging edges 21 is bent to form a certain angle θ and δ, respectively, such that the adjusting base 1 and the sliding base 2 are stably engaged in the shape of a wedge. Thus, mechanical strength and shock absorbency greatly increase, since engaging portions of the respective adjusting base 1 and sliding base 2 are angled as described above. The shoulder adjuster apparatus 10 having excellent impact resistance and improved safety characteristics can thus be obtained.

The latch mechanism 40 for stopping the sliding base 2 and the garnish 3 at a certain position on the adjusting base 1 has the plurality of lock holes 16 on the adjusting base 1 and the latch pin 41 elastically projected, by the effect of the spring 42, from the side of the garnish 3 to be inserted into the lock hole 16. Since this latch pin 41 is retained at the lower edge of the lock hole 16 that is formed to have a curved surface with the same curvature as that of the curved surface of the pin section 45, the pin section 45 and the lock hole 16 are always in close contact with each other, and the occurrence of noise and detachment of the pin caused by vibrations and the like are effectively prevented. Moreover, since no resin coating and O-ring is required for the pin section 45, material costs and production costs can be reduced.

Furthermore, the latch pin 41 includes the connecting-shaft section 47 at the end that is remote from the adjusting base 1. Since this connecting-shaft section 47 is directly screwed into the latch-pin securing section 48 of the inner button 43, which are adjacent to the garnish 3 and are provided for operating the latch pin 41, the connecting structure between the latch pin 41 and the inner button 43 is simplified, and the number of components required to form the shoulder adjuster apparatus 10 can be reduced.

Moreover, since the latch mechanism 40 is constituted of the inner button 43 and the outer button 44, and the engaging lugs 56 of the outer button 44 are reliably secured to the outer-button engaging parts 36 of the garnish 3 at the respective left and right sides, height changes caused by malfunctions of the buttons, when the shoulder adjuster apparatus 10 is in use, can be prevented, and a great improvement in safety can be achieved.

In particular, even if a tension caused by an impact is exerted on the webbing anchor 4 in one direction, an action force from one side does not cause the engaging lugs 56 on both left and right sides to be detached, and the height changes of the webbing anchor 4 due to malfunctions of the latch mechanism 40 can be prevented.

On the other hand, at the time of the height adjustment of the webbing anchor 4, the outer-button retainers 52 on the side walls of the inner button 43 and the button spring 57 provide an improved grip feeling at the time of holding the outer button 44. The shoulder adjuster apparatus 10 having high operability can thus be provided.

Moreover, the adjusting base 1 is in the form of a flat and curved plate, the sliding base 2 is in the form of a plate substantially matching the adjusting base 1, and the sliding base 2 is assembled inside the side walls 11 and the engaging portions 12 arranged in the width direction and along both edges of the adjusting base 1, while maintaining an overall flatness. Thus, an overall compactness of the structure of the shoulder adjuster apparatus 10 can be achieved.

Moreover, in the longitudinal direction of the adjusting base 1, there is a level difference between the middle section and both ends (upper and lower ends) to be attached to the car body, while the side walls 11 provided at both edges (left and right edges) in the width direction of the adjusting base I are inwardly bent to form the engaging portions 12, thereby forming the adjusting base 1 with a watershoot shape. Thus, the adjusting base 1 having a sufficient strength while maintaining an overall flatness can be obtained.

The sliding base 2 is provided with the mounting piece 26 at one end, while the garnish 3 is provided with the sliding-base fitting part 32 into which the mounting piece 26 is fitted. On the other hand, the other end of the sliding base 2 engages with the hook of the sliding-base engaging part 33 in the garnish 3 so as to integrally assemble the sliding base 2 and the garnish 3. Thus, no special component is required in assembling the sliding base 2 and the garnish 3.

Furthermore, the surface of the garnish 3 to be attached to the adjusting base 1 is provided with the sliding-base fitting part 32 and the sliding-base engaging part 33 so as to be fitted in the adjusting base 1 more closely, compared to the degree of fit between the sliding base 2 and the adjusting base 1. Metallic contact between the adjusting base 1 and the sliding base 2, which are both made of metal, is thus prevented, and no cushion and the like for noise prevention is required. Thus, the shoulder adjuster apparatus 10 can be produced at low cost.

INDUSTRIAL APPLICABILITY

As described above, according to the shoulder adjuster apparatus of the present invention, impact resistance in the engaging portion between the adjusting base and the sliding base is enhanced, while malfunctions of the shoulder adjuster apparatus caused by an action force being exerted from one direction, at the time of an impact, is prevented. Thus, a safe shoulder adjuster apparatus having excellent operability can be provided.

The invention claimed is:

1. A shoulder adjuster apparatus comprising:
an adjusting base secured to a mount portion of a vehicle body frame;
a sliding base mounted to the adjusting base so as to be slidable along an adjusting direction;
a garnish member mounted to a front surface side of the sliding base;
a latch mechanism configured for selectively stopping the garnish member and the sliding base at a predetermined position in a longitudinal direction of the adjusting base; and
a webbing anchor mounted to the sliding base and the garnish member,
wherein the adjusting base includes side walls formed by bending both edges thereof, which are arranged in a width direction of the adjusting base, at substantially 90 degrees with respect to a flat surface attachable to the vehicle body frame and also includes engaging portions formed by bending the edges of the side walls toward the inside of the adjusting base, in which the side walls and the engaging portions form acute angles, and the sliding base is slidably inserted into a sliding part, which is defined by the flat surface, the side walls, and the engaging portions, in an adjusting direction, and
wherein both edges of the sliding base are arranged in a width direction and are bent to form engaging edges; and bending angles of the engaging edges range from 10 to 20 degrees with respect to a flat surface of the sliding base on a side of the vehicle body frame.

2. The shoulder adjuster apparatus according to claim 1, wherein the angles formed by the side walls and the engaging portions range from 70 to 80 degrees.

3. A shoulder adjuster apparatus comprising:
an adjusting base secured to a mount portion of a vehicle body frame;
a sliding base mounted to the adjusting base so as to be slidable along an adjusting direction;
a garnish member mounted to a front surface side of the sliding base;
a latch mechanism for selectively stopping the garnish member and the sliding base at a predetermined position in a longitudinal direction of the adjusting base; and
a webbing anchor mounted to the sliding base and the garnish member,
wherein the adjusting base includes side walls formed by bending both edges thereof, which are arranged in a width direction of adjusting base, at substantially 90 degrees with respect to a flat surface attachable to the vehicle body frame and also includes engaging portions formed by bending the edges of the side walls toward the inside of the adjusting base, in which the side walls and the engaging portions form acute angles, and the sliding base is slidably inserted into a sliding part, which is defined by the flat surface, the side walls, and the engaging portions, in the adjusting direction, and
the latch mechanism comprises: a spring; a latch pin removably inserted, from a side of the sliding base facing the garnish member, into a lock hole of the adjusting base by an elastic force of said spring; an inner button integrally secured to the latch pin provided with said spring; and an outer button covering the inner button so as to come into contact with the garnish member, wherein at least one engaging lug is provided on each of both surfaces of the outer button configured to be in contact with the garnish member, the surfaces being arranged in a width direction, to engage with at least one outer button engaging a part provided on each of both surfaces of the garnish member to be in contact with the outer button, the surfaces being arranged in the width direction so as to secure the latch mechanism at both sides; and wherein the engaging lugs and the outer button engaging parts on both sides are disengaged by holding both sides of the outer button so as to freely insert the latch pin into and to be pulled out of the lock hole in the adjusting base.

4. The shoulder adjuster apparatus according to claim 3, wherein a shape of a curved surface of a cylindrical pin section of the latch pin to be inserted into the lock hole in the adjusting base is the same as a shape of the lock hole in the adjusting base, thereby placing the pin section of the latch pin in close contact with an inner periphery of the lock hole in the adjusting base when the webbing anchor is fixed in place.

5. The shoulder adjuster apparatus according to claim 3, wherein the latch pin is screwed into a latch-pin securing section provided in the inner button.

6. The shoulder adjuster apparatus according to claim 3, wherein the angles formed by the side walls and the engaging portions range from 70 to 80 degrees.

* * * * *